United States Patent
Shimoi et al.

(10) Patent No.: US 7,145,856 B2
(45) Date of Patent: Dec. 5, 2006

(54) DATA RECORDING DEVICE AND CONTROLLER FOR DATA RECORDING DEVICE

(75) Inventors: Yasuyuki Shimoi, Osaka (JP); Yasuhisa Mashiko, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 855 days.

(21) Appl. No.: 10/270,046

(22) Filed: Oct. 15, 2002

(65) Prior Publication Data
US 2003/0095479 A1  May 22, 2003

(30) Foreign Application Priority Data
Oct. 15, 2001  (JP)  ............................. 2001-316558

(51) Int. Cl.
*G11B 27/36*  (2006.01)
(52) U.S. Cl. ............................... 369/53.36; 369/53.31; 369/53.44
(58) Field of Classification Search ............ 369/53.31, 369/53.35, 53.36, 53.44, 47.33, 30.21, 30.22, 369/30.23, 30.24
See application file for complete search history.

(56) References Cited

U.S. PATENT DOCUMENTS 5,815,472 A  9/1998  Kuroda et al.
6,487,616 B1 *  11/2002  Hayashi .................... 369/47.32
6,930,964 B1 *  8/2005  Matsui ..................... 369/53.31
6,992,957 B1 *  1/2006  Hayashi et al. ........... 369/53.31
6,996,046 B1 *  2/2006  Ono et al. ................ 369/53.37

FOREIGN PATENT DOCUMENTS

| JP | 10-49990 | 2/1998 |
| JP | 10-063433 | 3/1998 |
| JP | 2000-40302 | 2/2000 |

\* cited by examiner

*Primary Examiner*—Thang V Tran
(74) *Attorney, Agent, or Firm*—McDermott Will & Emery LLP (57) ABSTRACT

A recording interruption-controlling section interrupts recording if vibration is detected in order to complete proper recording by making it possible to interrupt and restart recording in cases where proper recording is difficult to continue because of vibration or the like. A recording quality-confirming section reproduce a recording signal after the recording has been interrupted and detects a recording location at which degradation in recording quality occurs. A CD-ROM encoder or a CD encoder re-encodes data held in a buffer, and recording is restarted from the location at which degradation in recording quality occurs under the control of a recording restart-controlling section.

10 Claims, 10 Drawing Sheets

FIG. 4A recording interruption signal vibration detected and recording interrupted

FIG. 4B state of recording (RF signal level during reproducing)

recording quality degraded vibration occur

FIG. 4C reproduced data for confirming recording quality subcode sync detected recording restart location subcode sync not detected block address    n    n+1    n+2    n+3    n+4 re-encoding start block
(set in block address registers 112a and 113a)

recording restart block value to be held in block address register 203b subcode-sync-not-detected signal

FIG. 4D recording restart signal

FIG. 4E state of recording after re-recording recording quality improved (for CD-RW etc.)

DATA RECORDING DEVICE AND CONTROLLER FOR DATA RECORDING DEVICE

BACKGROUND OF THE INVENTION

The present invention relates to data recording devices for recording and reproducing data on optical disks such as CD-R (Compact Disc Recordable) or CD-RW (Compact Disc Rewritable).

When recording data in optical disks such as CD-Rs and CD-RWs, an entire track or optical disk needs to be completed with one recording operation, as implied by the names of methods for writing disks, such as Disk-at-once and Track-at-once. Thus, if a data recording fails, the whole optical disk becomes unusable or the previously recorded data are lost. The recording failure can be caused by, for example, a buffer underrun error. The buffer underrun error occurs because the buffer, in which recording data are temporarily stored, is emptied when the data transfer speed of the recording data transferred from the host is slower than the data recording speed of the optical disk device and consequently a recording operation cannot be continued.

In view of this problem, Japanese Unexamined Patent Publication Nos. 10-49990 and 2000-40302 disclose an apparatus that can temporarily suspend recording operation when the recording failure is expected to occur and can restart afterwards. This apparatus has a configuration as follows. When the recording data held in the buffer reduces while the recording operation is being underway, that is, when a buffer underrun error is likely to occur, the recording operation is interrupted, and the internal information at that point is held, specifically, such as the data to be recorded next (more specifically, the pattern data indicating a pit pattern to be actually recorded and the data which are necessary to generate the pattern data) and the information indicating that the recording should be restarted at what clock of which frame. When a predetermined amount of data has been accumulated in the buffer, and after a subcode sync is detected, the recording location for the next data is detected by counting the PLL (Phase Locked Loop) clock of the channel bit, and then the recording is restarted.

However, the above-described conventional data recording device has the following problem. In such cases where buffer underrun error occurs, the above-described conventional data recording device can complete data recording properly by temporarily suspending recording operation and thereafter restarting the recording. However, if, for example, there is an external factor such as vibration, recording cannot always be completed properly. More specifically, in cases where there is an external factor such as vibration, it is likely that the data that are immediately before the interruption of recording have not been written properly due to delay in detecting the external factor or the like, and for this reason, it is difficult to secure continuity with the point where recording is interrupted with a precision in the units of channel clocks even if the restart of recording is attempted after having temporarily suspended the recording operation as in cases where buffer underrun errors occur.

SUMMARY OF THE INVENTION

In view of the foregoing and other problems, it is an object of the present invention to provide a data recording device and a controller therefor that can interrupt and restart recording to complete proper recording even when appropriate recording is difficult to continue because of external factors such as vibration.

This and other objects are accomplished in accordance with the present invention by providing a controller for a data recording device wherein, if recording to a recording medium is temporarily interrupted, then recording of unrecorded data is restarted so as to maintain continuity with recorded data that have been recorded before the interruption of the recording, comprising:

a detecting means for detecting a factor that degrades recording quality;

a recording interruption-controlling means for controlling the interruption of the recording according to the result of the detection performed by the detecting means; and a recording restart-controlling means for restarting the recording operation from a location that is before the location at which the recording of the recorded data has been interrupted in the recording medium.

The detecting means may be configured to detect occurrences of a factor that degrades the recording quality based on the amount of the disturbance in servo control of mechanical operations during recording or the amount of vibration effected on the data recording device during recording.

Accordingly, with the recording restart-controlling means, even when recording quality has been degraded before the interruption of recording because of the effect of vibration or the like, recording can be restarted from a location that is before the location in which recording quality is degraded so that continuity with the already-recorded data can be maintained at a high precision in the units of channel clocks.

The above-described controller for a data recording device may further comprises a recording quality-detecting means for detecting recording quality by reproducing recorded content subsequent to the interruption of recording;

wherein the recording restart-controlling means is configured to decide the location at which the recording operation is restarted according to the recording quality.

The recording quality-detecting means may be configured to detect the recording quality according to whether a synchronization pattern in a reproduced signal is detected or not, a state of error occurrence in the reproduced signal such as the presence or absence of error, the degree of error, and the frequency of error occurrence, an amplitude of the reproduced signal, or the like.

Thus, it is possible to control the overlap between the portion with low recording quality that has been recorded before the interruption of recording and the portion that is recorded after the interruption in restarting the recording.

The foregoing controller for a data recording device may further comprise a data buffer for holding recording data that have not yet been subject to interleaving;

wherein, prior to the restart of the recording operation, interleaving is performed again from the recording data that is at least an interleaving length backward from recording data corresponding to the location in the recording medium at which the recording operation is to be restarted.

Accordingly, even if recording needs to be restarted from a location that is backward of the location at which recording was interrupted, the internal state of the device at the time when recording is restarted is made the same as the internal state when a recording restart location was recorded before the interruption. Therefore, the same recording result as the case where recording is not interrupted can be obtained in terms of interleaving.

The foregoing controller for a data recording device may further comprise a data match-detecting means for detecting a match between at least part of pre-recorded data that are used for the recording prior to the interruption of the recording and reproduced data that are reproduced subsequent to the interruption of the recording; and a recording restart location-deciding means for deciding a location at which the recording is to be restarted according to the detection of the data match detected by the data match-detecting means.

With this configuration, even when the recording quality of the portion that has been recorded before the interruption or when the reproducing clock phase is shifted because of scratches or the like on the recording medium, recording can be restarted with reference to the portion in which the recording data and the reproduced data match. Therefore, the same recording result as that when recording is not interrupted can be easily obtained.

The present invention also provides, according to further another aspect, a data recording device wherein, if recording to a recording medium is temporarily interrupted, then recording of unrecorded data is restarted so as to maintain continuity with recorded data that have been recorded before the interruption of the recording, comprising:

a recording data-generating means for generating recording data;

a recording means for recording the generated recording data;

a detecting means for detecting a factor that degrades recording quality;

a recording interruption-controlling means for controlling the interruption of the recording according to the result of the detection performed by the detecting means; and a recording restart-controlling means for restarting the recording operation from a location that is before the location at which the recording of the recorded data has been interrupted in the recording medium by operating the recording data-generating means and the recording means.

With this configuration, even when recording quality is degraded because of vibration or the like before the interruption of recording, the recording is restarted from a preceding location in which recording quality is not degraded, and consequently, it is possible to obtain a data recording device that can restart recording while maintaining continuity with the already-recorded data at a precision in the units of channel clocks.

DETAILED DESCRIPTION OF THE INVENTION

Referring to the drawings and taking a CD-R recording device as an example, preferred embodiments of the present invention are detailed below.

Embodiment 1

Figure 1:
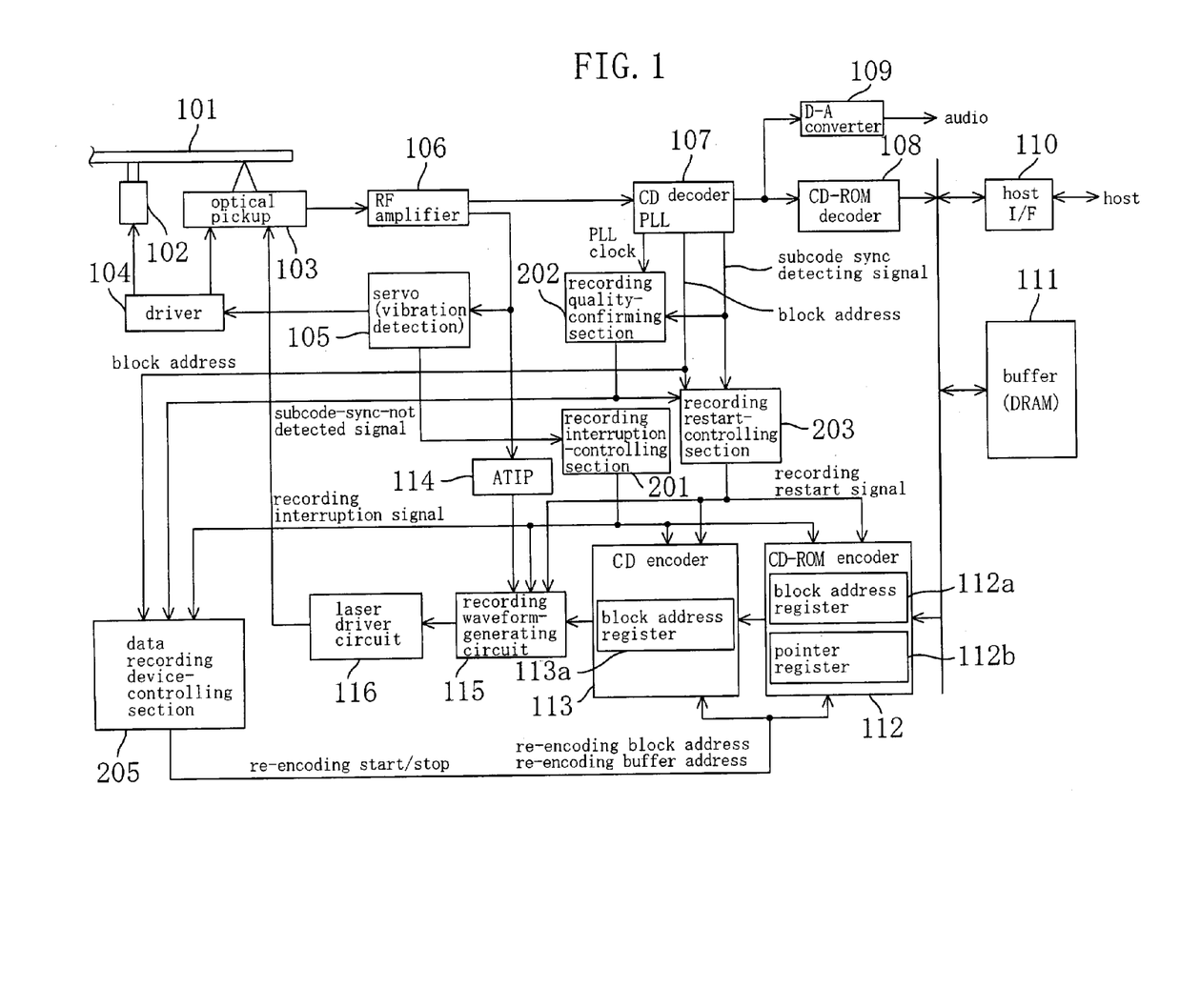
FIG. 1 is a block diagram showing the entire configuration of a data recording device according to Embodiment 1 of the invention.

FIG. 1 is a block diagram showing the entire configuration of a data recording device according to Embodiment 1 of the present invention. This data recording device comprises:

a spindle motor 102 that rotationally drives an optical disk 101;

an optical pickup 103 that performs data recording and reproducing for the optical disk 101 by irradiating it with laser light and receiving the reflected light;

a driver 104 that drives the spindle motor 102 and the optical pickup 103;

a servo circuit 105 that controls the rotation speed of the spindle motor 102 and the focusing and tracking of the optical pickup 103;

an RF amplifier 106 that outputs an amplified RF signal, which is an amplified signal of the RF signal that is output from the optical pickup 103, and a digital signal corresponding to a channel bit, which is created by binarizing the amplified RF signal;

a CD decoder 107 and CD-ROM decoder 108 that generates a PLL clock and performs de-interleaving and error correction handling based on the digital signal;

a D-A converter 109 that converts a digital signal that is output from the CD decoder 107 into an analog audio signal when music data are reproduced;

a host interface 110 that transfers recording data and reproduced data between the device and a personal computer or the like that serves as a host;

a buffer 111 that temporarily stores the recording data and the reproduced data;

a CD-ROM encoder 112 and a CD encoder 113 that modulates the recording data stored in the buffer 111 by performing addition of error correction codes and interleaving, to generate pattern data indicating the pit pattern that is to be actually recorded in the optical disk 101;

an ATIP decoder 114 that extracts a wobble signal from the amplified RF signal that is output from the RF amplifier 106 and demodulates ATIP (Absolute Time In Pre-Groove) that indicates absolute time information;

a recording waveform-generating circuit 115 that generates a recording waveform suitable for the recording medium according to the pattern data that is output from the CD encoder 113;

a laser driver circuit 116 that generates a laser driving current for the optical pickup 103 based on the recording waveform generated by the recording waveform-generating circuit 115;

a recording interruption-controlling section 201 that comprises, for example, a comparator, the recording interruption-controlling section 201 being such that it determines that there is a disturbance such as vibration when the level of a servo signal output from the servo circuit 105 during recording becomes equal to more than a predetermined level, and accordingly outputs a recording interruption signal to the CD-ROM encoder 112 or the like;

a recording quality-confirming section 202 that detects degradation in recording quality by reproducing already recorded data after the interruption of recording;

a recording restart-controlling section 203 that controls the restart of the recording that has been interrupted; and a data recording device-controlling section 205 that controls the operations of the data recording device as a whole, for example, that stops the operations in various portions when a recording interruption signal is output from the recording interruption-controlling section 201, and performs the control of a reproducing operation for confirming recording quality in order to confirm recording quality or the control of letting the CD-ROM encoder 112 and the CD encoder 113 perform re-encoding.

Figure 2:
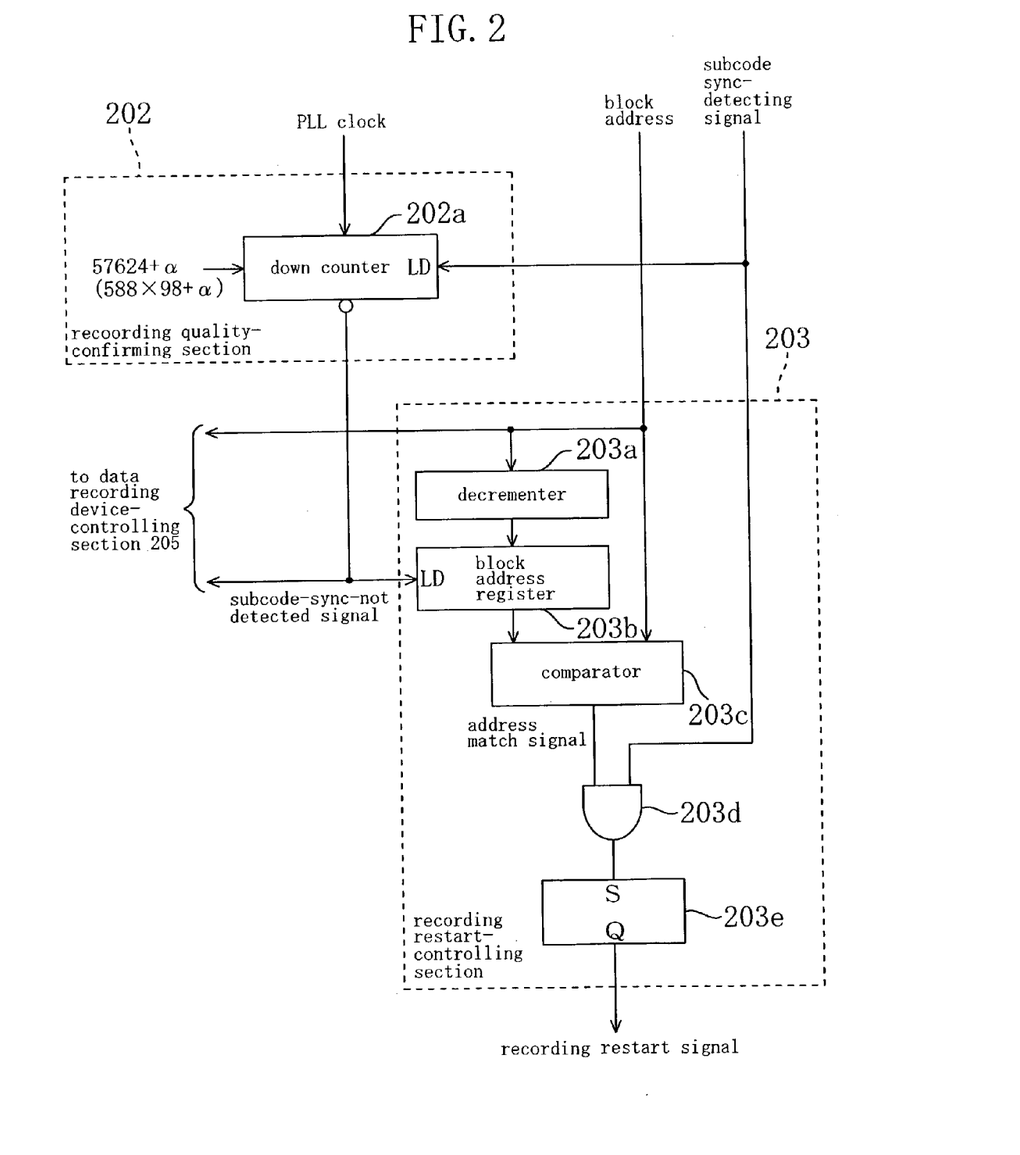
FIG. 2 is a circuit diagram showing the configuration of a recording quality-confirming section 202 and a recording restart-controlling section 203.

More specifically, the recording quality-confirming section 202 has a down counter 202a, as shown in FIG. 2. During reproducing for confirming recording quality that is performed after the interruption of recording, the down counter 202a is configured to output a subcode-sync-not-detected signal if the next subcode sync is not detected from the time when the subcode sync of each block is detected until the clock cycles for approximately 1 block is counted.

The recording restart-controlling section 203 includes: a decrementer 203a that decrements the block address output from the CD decoder 107 by 1 at the time point when the subcode-sync-not-detected signal is output; a block address register 203b that holds a block address output from the decrementer 203a; a block address comparator 203c that compares the block address held in the block address register 203b with a block address output from the CD decoder 107 during later-performed reproducing for detecting a recording restart location; an AND circuit 203d in which an address match signal output from the block address comparator 203c is ANDed with a subcode sync-detecting signal output from the CD decoder 107; and a flip-flop 203e that holds an output from the AND circuit 203d.

Figure 3:
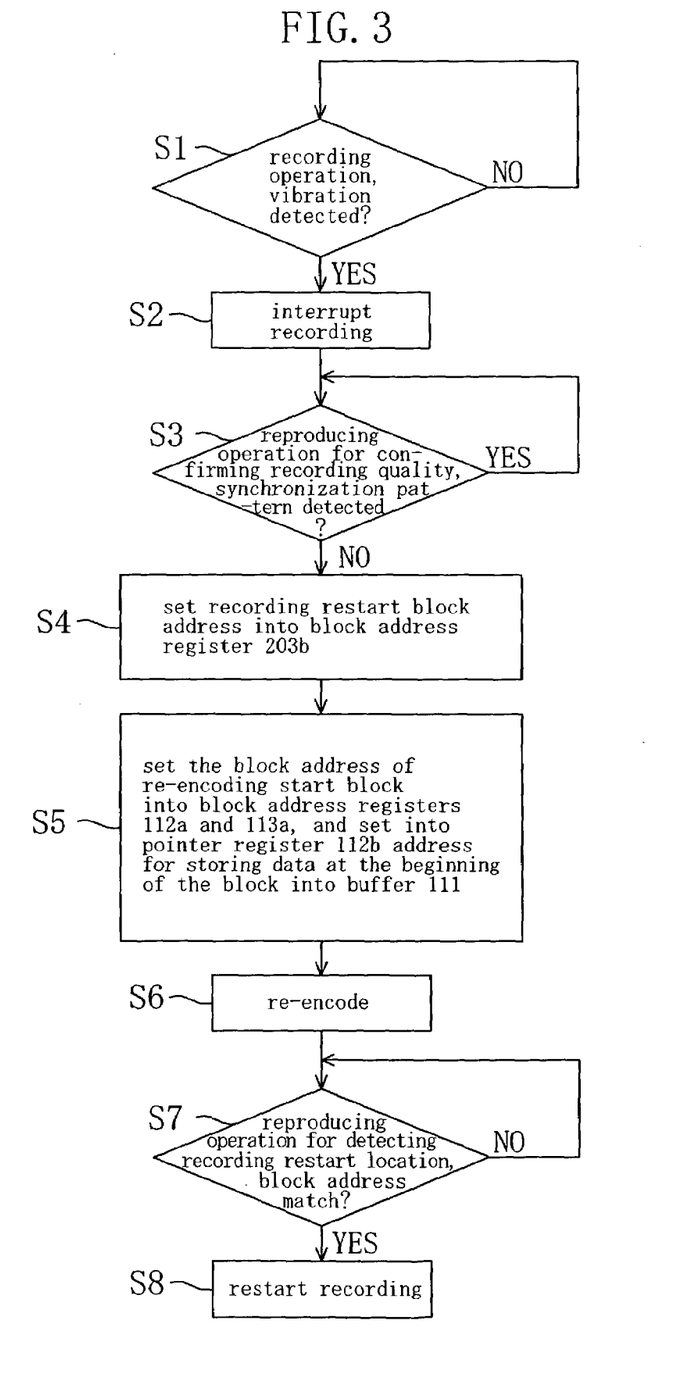
FIG. 3 is a flow-chart showing a recording restart operation.

Next, the operation of the data recording device thus configured is detailed below with reference to FIG. 3. FIG. 3 is a flow-chart schematically shows the operation of the data recording device.

Recording Operation (S1) The operation itself for recording data onto the optical disk 101 is carried out in a similar manner to that in conventional data recording devices. Specifically, recording data that are transferred from the host via the interface 110 are temporarily stored in the buffer 111 and are thereafter subject to the addition of error correction codes and interleaving with the CD-ROM encoder 112 and the CD encoder 113, to generate pattern data indicating the pit pattern that is actually to be recorded. Then, the generated pattern data is recorded when it is detected that the optical pickup 103 has reached a location at which the recording is to be started in the optical disk 101 based on the ATIP that is demodulated by the ATIP decoder 114.

Figure 4A:
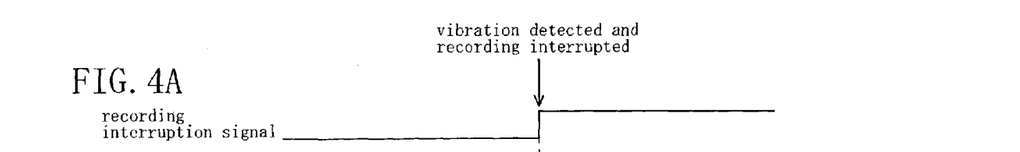
FIG. 4 schematically shows recording signals and the like before and after re-recording.

The recording interruption-controlling section 201 determines that there is a disturbance such as vibration when the level of the servo signal that is output from the servo circuit 105 becomes equal to or higher than a predetermined level, and it outputs a recording interruption signal to the CD-ROM encoder 112, the CD encoder 113, the recording waveform-generating circuit 115, and the data recording device-controlling section 205 (FIG. 4A).

Figure 4B:
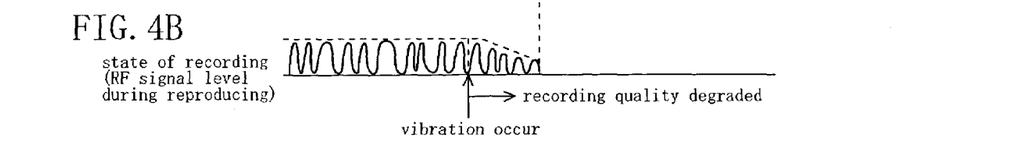

Recording Interruption Operation (S2) In response to the recording interruption signal, recording to the optical disk 101 is interrupted (FIG. 4B). More specifically, the writing clock supplied to the CD-ROM encoder 112 and the like is stopped, and the CD-ROM encoder 112 and the CD encoder 113 interrupt the processing such as interleaving or the like. Also, the recording waveform-generating circuit 115 switches the driving waveform for the optical pickup 103 from a waveform for recording to a waveform for reproducing.

Reproducing Operation for Confirming Recording Quality (Determining Recording Restart Location)

(S3) When it is determined that there is no more effect of vibration, reproducing operation for confirming recoding quality is carried out. In this reproducing operation for confirming recoding quality, a similar operation to a normal reproducing operation is carried out from a location at least before the recording location at which the recording has been interrupted.

In accordance with the reproducing operation, recording quality is confirmed, for example, according to whether the subcode sync at each block is detected or not. Specifically, first, at the time point when the subcode sync is detected, a value (clock cycle of the subcode sync+$\alpha$) is preset in the down counter 202a of the recording quality-confirming section 202, and thereafter, the value is decremented according to PLL clock. Then, if the next subcode sync is detected within (clock cycle+$\alpha$), the value held in the down counter 202a does not become 0, and therefore, the subcode-sync-not-detected signal is maintained at an L (low) level. In contrast, if the next subcode sync is not detected within (clock cycle+$\alpha$), the value held in the down counter 202a becomes 0, and the subcode-sync-not-detected signal becomes an H (high) level. In the case of CD-R, as one EFM frame consists of 588 bits and one block consists of 98 EFM frames, the clock cycle is: 588×98=57,624 clock cycles. It should be noted that a is an allowance so that even when the next subcode sync is detected at a slightly off location, it is not determined that it has not been detected, because when the PLL clock phase is shifted, the next subcode sync is not necessarily detected precisely at the 57,624th clock cycle.

Figure 4C:
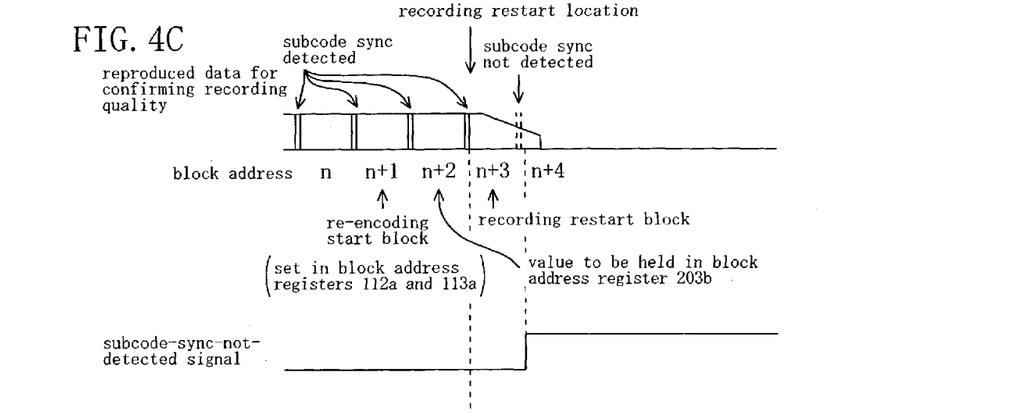

(S4) At the time when the subcode-sync-not-detected signal is output from the down counter 202a (FIG. 4C), at that time point, the block address (n+3) of a block (block at which recording is restarted) that is one block before the block at which the subcode sync has not been detected is output from the CD decoder 107. Then, the value is decremented by the decrementer 203a by 1, and the obtained value n+2 is held in the block address register 203b. (The location at the beginning of the recording restart block (n+3) becomes the recording restart location.) Here, in the CD decoder 107, the block address can be obtained from the sub Q code or the header of each block, but if the proper block address cannot be obtained, the block address may be obtained, for example, by incrementing the previously-obtained block address. In addition, the level of the subcode-sync-not-detected signal is not limited to H level, and it is sufficient that when the value held in the down counter 202a becomes 0, the value that is output from the decrementer 203a is loaded to the block address register 203b.

Re-encoding Operation (S5) The subcode-sync-not-detected signal and the block address (n+3) of the recording restart block that is output from the CD decoder 107 are also input to the data recording device-controlling section 205. Then, by the data recording device-controlling section 205, the block address (n+1) of a block (re-encode start block) that is two blocks before the recording restart block is set into block address registers 112a and 113a of the CD-ROM encoder 112 and the CD encoder 113, respectively. This block address is used for generating the header and the sub-Q data of the block. Also, the address of the region in the buffer 111 in which the data corresponding to the beginning of the re-encoding start block is stored is computed and is set into a pointer register 112b of the CD-ROM encoder 112. The reason why the block that is two blocks before the recording restart block (n+3), which is (n+1), is set to be the re-encoding start block as described above is that, in order to obtain a pattern data to be written in the optical disk 101, it is necessary to carry out an interleaving from the pre-interleaving data that is at least an interleaving length (24 byte×108 EFM frame=2,592 byte) before, and that, in order to obtain the pre-interleaving data, it is normally necessary to carry out, for example, the generation of P or Q parity from at least the beginning of the block containing the data (24 byte×98 EFM frame=2,352 byte). It should be noted that when recording is performed according to mode 2, in which P or Q parity is not generated, re-encoding may be performed from the data that is before only the interleaving length since the data held in the buffer 111 themselves are the pre-interleaving data, but when re-encoding is performed from the beginning of the block, it is easier to perform the processing such as adding the synchronization pattern or the header of the block. Also, the interleaving may be performed from any location, for example, from the beginning of the recording data, as long as it is before the above-described locations.

(S6) According to the control from the data recording device-controlling section 205, the CD-ROM encoder 112 and the CD encoder 113 perform re-encoding from the data in the buffer 111 that are indicated by the pointer register to the data that correspond to the recording restart location. This re-encoding operation is the same as the operation performed during normal recording except that recording is not actually performed. The timing for ending the re-encoding may be controlled based on the address in the buffer 111 from which the data are read out, or based on the block address of the block to be re-encoded, or by counting clock cycles when re-encoding is performed.

When re-encoding is thus carried out, the internal states in the CD-ROM encoder 112 and the CD encoder 113 are made the same internal states as at the time when recording is performed up to the location that is immediately before the recording restart location in the initial recording operation.

Figure 4D:
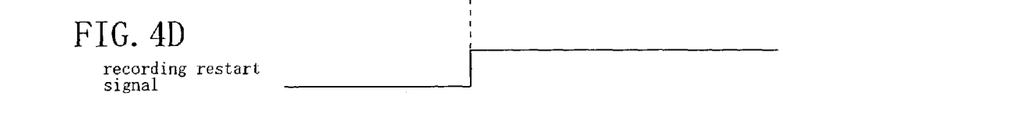

Operation for Detecting Recording Restart Location (S7) A similar operation to the normal reproducing operation is performed again to detect a location for restarting recording. More specifically, a similar operation to the normal reproducing operation is performed, and at the same time, the flip-flop 203e outputs a recording restart signal that is at an H level when the block address comparator 203c detects a match between the block address output from the CD decoder 107 and the block address held in the block address register 203b and the CD the decoder 107 outputs a subcode sync-detecting signal (FIG. 4D). It should be noted that recording quality is ensured because this recording restart location has already been confirmed with the reproducing operation for confirming recording quality.

Figure 4E:
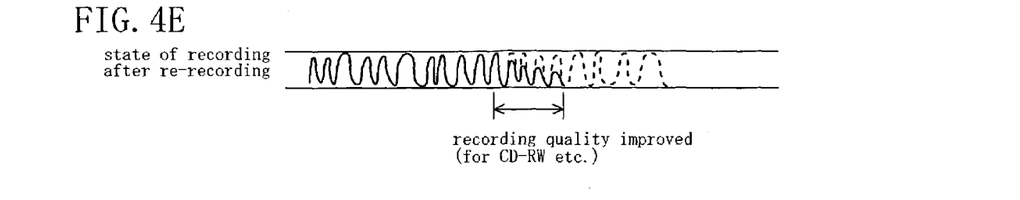

Recording Restart Operation (S8) With the recording restart signal, the CD-ROM encoder 112, the CD encoder 113, the recording waveform -generating circuit 115, and so forth restart their operations, and recording is restarted. In this case as well, it is easy to increase the data continuity at a precision in the units of channel clocks since the quality of the recorded data is secured. Moreover, with rewritable media such as CD-RWs, recording quality that has been degraded due to vibration or the like is improved between the recording restart location and the location at which recording has been interrupted, since the data are overwritten, and after the location at which recording has been interrupted, recording is performed at normal recording quality (FIG. 4E)

Figure 5A:
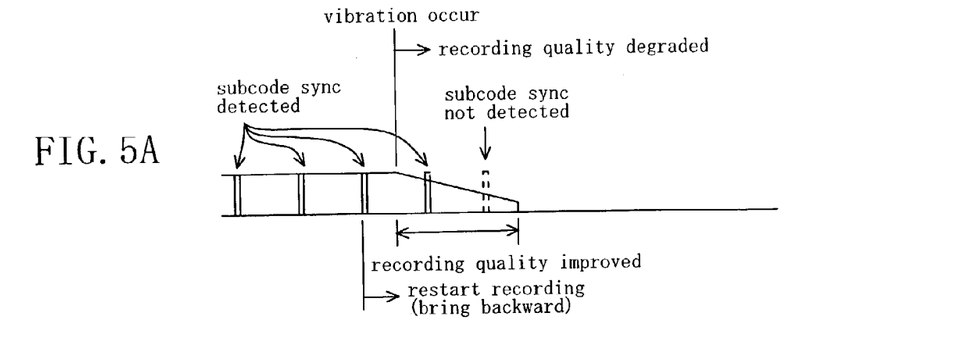
FIG. 5 schematically shows recording signals and the like in accordance with another embodiment.
Figure 5B:
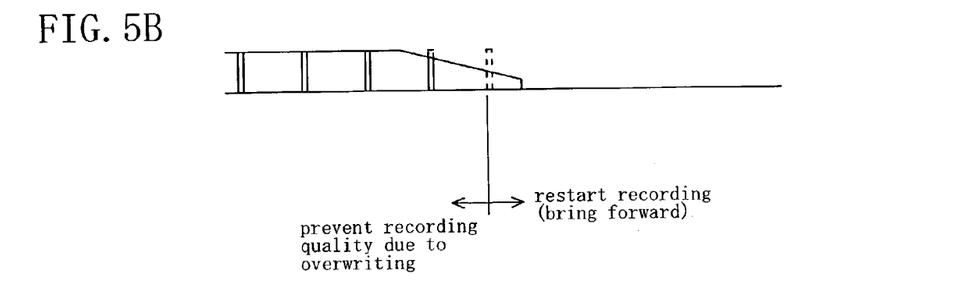

In the foregoing example, recording is restarted from the beginning of the last block at which the subcode sync is detected, but it is also possible to restart recording from locations that are offset before or after that block or from the beginning of the immediately before or after that block. More specifically, for example, if recording quality has been degraded before that block even though the subcode sync is detected as shown in FIG. 5A, it is possible to improve the recording quality of the portion before that block by bringing the recording restart location backward to re-record the data with rewritable media such as CD-RWs. Conversely, depending on characteristics of the recording medium or the like, if recording quality is not easily improved even though the data are overwritten in the portion with a certain recording quality or if there is a possibility that recording quality is rather degraded, recording may be restarted from the block at which subcode sync has not been detected, as shown in FIG. 5B.

Figure 5C:
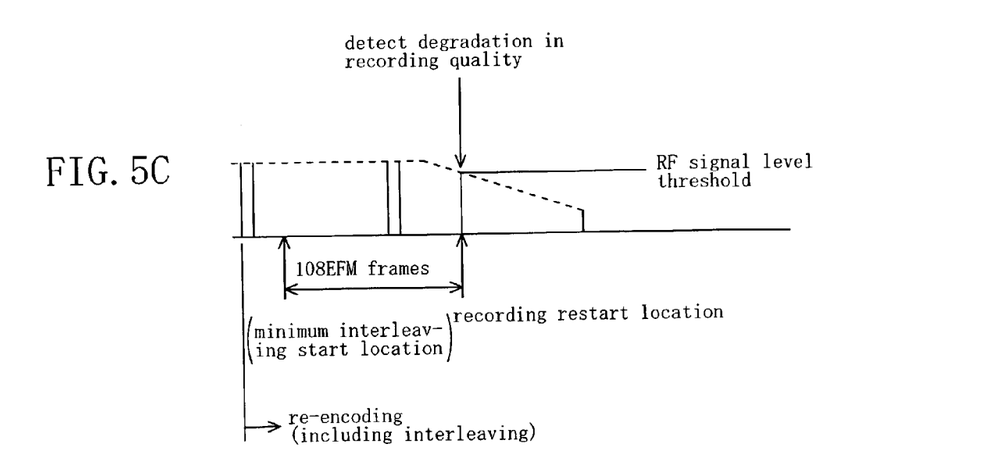

In addition, in the present embodiment, degradation in recording quality is described to be detected according to whether subcode sync is detected or not, but this is for illustrative purposes only. For example, degradation in recording quality may be detected from the level (amplitude) of the RF signal that is output from the RF amplifier 106, the margin of the level of the RF signal against the slice level when binarization is performed, whether or not error correction is performed by the CD decoder 107 or the frequency and degree thereof, the degree of phase shift in synchronization of PLL, or the combinations thereof. In such cases, the restart of recording is not performed in the units of blocks, but as shown in FIG. 5C, it may be restarted with reference to the location at which degradation in recording quality is detected, that is, from the location at which degradation in recording quality is detected or the location that is offset before or after of the location. In addition, the amount of the offset may be set variable according to the recording quality. Such control of the recording restart location can be performed by, for example, counting clock cycles from the location of the subcode sync that is before the recording restart location. Even in these cases, the CD-ROM encoder 112 and the CD encoder 113 may carry out re-encoding in the units of blocks as previously described.

The present embodiment describes that re-encoding operation (S5) is performed in order to explain claim 7, but another configuration also possible in which the signal between the CD encoder 113 and the recording waveform-generating circuit 115 is input to another buffer so as to be stored therein, and the writing from the location of restart to the location of interruption is output from the buffer. In this case, re-encoding is unnecessary.

Embodiment 2

The present embodiment describes a data recording device that can appropriately restart recording even when an optical disk has a scratch or when the pit pattern is unstable because of vibration or the like during recording.

Figure 7:
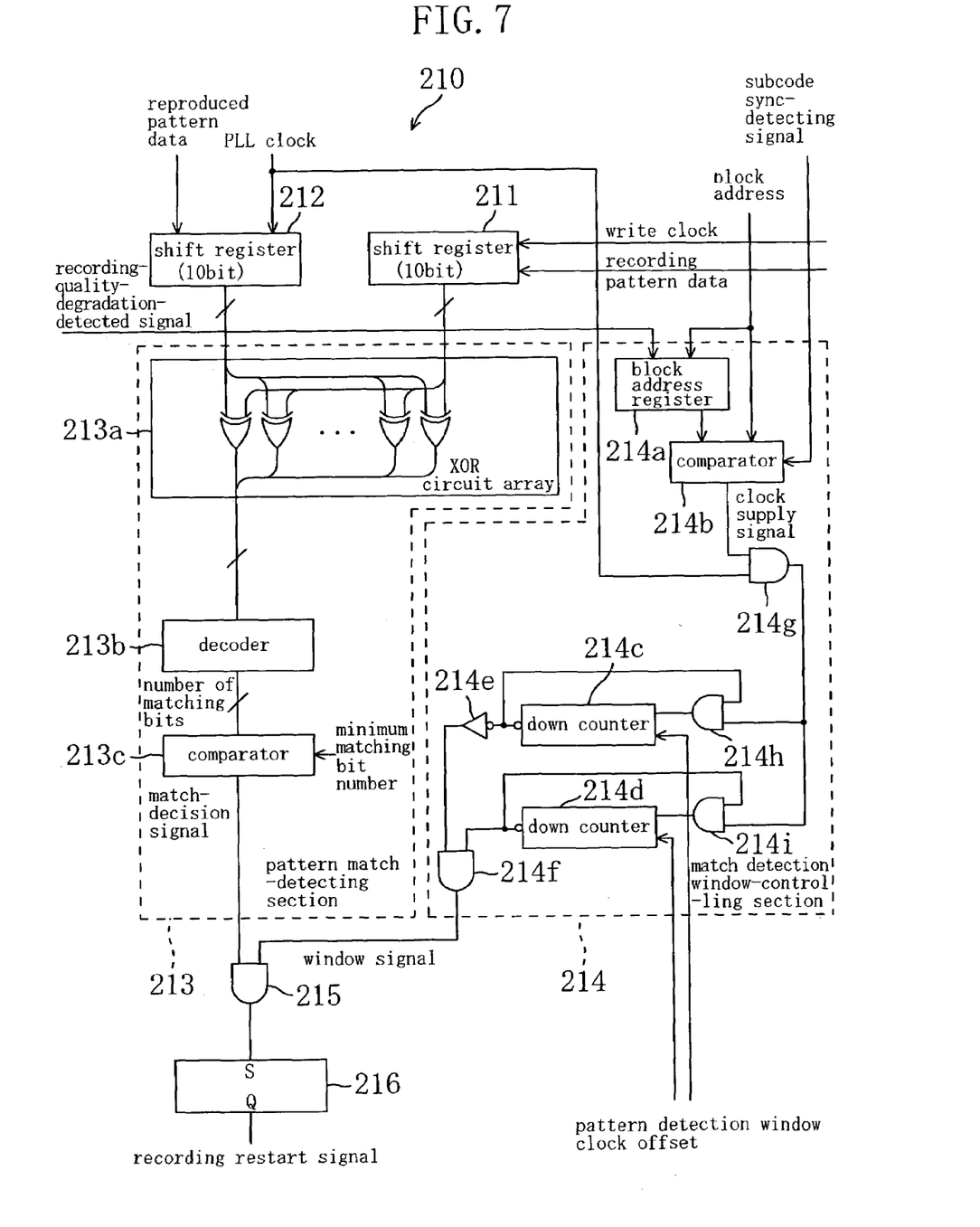
FIG. 7 is a circuit diagram showing the configuration of a recording restart-controlling section 210 in the data recording device.

The device according to Embodiment 2 is differs from the device of the foregoing embodiment 1 (FIG. 1) in that it comprises a recording quality-confirming section 209 and a recording restart-controlling section 210 in place of the recording quality-confirming section 202 and the recording restart-controlling section 203. The recording quality-confirming section 209 is configured to detect degradation in recording quality, for example, according to the level (amplitude) of the RF signal that is output from the RF amplifier 106. The recording restart-controlling section 210 comprises, for example as shown in FIG. 7:

a shift register 211 with, for example, 10-bit width that sequentially shifts and holds a pattern data (comparison pattern data) indicating a pit pattern of the data that are recorded when re-encoding;

a shift register 212 with, for example, 10-bit width that sequentially shifts and holds the pattern data that are reproduced (reproduced pattern data) when performing the detection of the recording restart location;

a pattern match-detecting section 213 that detects a match between the comparison pattern data and the reproduced pattern data held in the shift registers 211 and 212;

a match detection window-controlling section 214 that controls the range (window) in which the match between the pattern data is to be detected;

an AND circuit 215; and a flip-flop 216.

Figure 6:
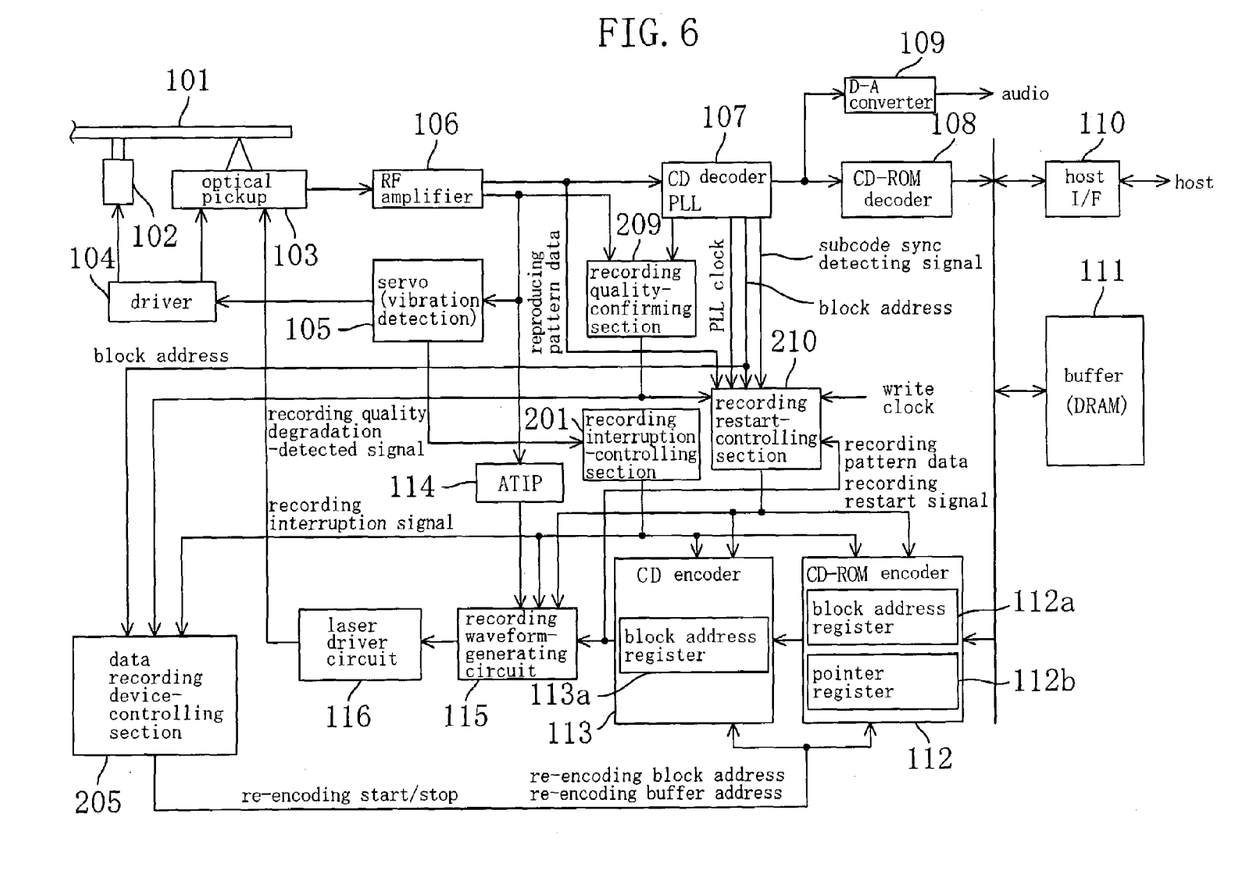
FIG. 6 is a block diagram showing the entire configuration of a data recording device according to Embodiment 2.

The pattern match-detecting section 213 has an XOR circuit array 213a in which each bit that is output from the shift registers 211 and 212 is XORed, a matching bit number-counting section 213b that counts and outputs the number of bits that are at an L level among the outputs for respective bits from the XOR circuit array 213a, and a comparator 213c that decides if the number of bits that are at an L level is equal to or greater than a predetermined minimum bit number. Specifically, the matching bit number-counting section 213b comprises, for example, a decoder that outputs a number of bits that are at an L level according to input bit patterns, or a multiple input adder. The minimum matching bit number is given to the comparator 213c, for example, by the data recording device-controlling section 205 (see FIG. 6). It should be noted that if recording should be restarted only when all the bits match, an inverted input AND circuit may be employed in place of the matching bit number-counting section 213b and the comparator 213c.

The match detection window-controlling section 214 has a block address register 214a, a comparator 214b, a detection start counter 214c, a detection end counter 214d, an inverter 214e, and AND circuits 214f to 214i. The block address register 214a holds, in response to the recording-quality-degradation-detected signal that is output from the recording quality-confirming section 202, a block address that is output from the CD decoder 107 and is one before the block at which degradation in recording quality is detected. The comparator 214b compares the block address detected by the CD decoder 107 when recorded data are reproduced prior to the restart of the recording with the block address that has been held in the block address register 214a, and it outputs a clock supply signal at an H level when the subcode sync of the next block, which is the last recorded block (the block at which degradation in recording quality is detected), is detected after the compared block addresses have matched. The detection start counter 214c and the detection end counter 214d count the number of clocks (the number of channel bits) from the start of the H-level clock supply signal output until the pattern data match detection is started or ended.

This data recording device principally differs from the device of the foregoing embodiment 1 in the following points in terms of the reproducing operation for confirming recording quality (determining recording restart location), the re-encoding operation, and the operation for detecting recording restart location.

Figure 8:
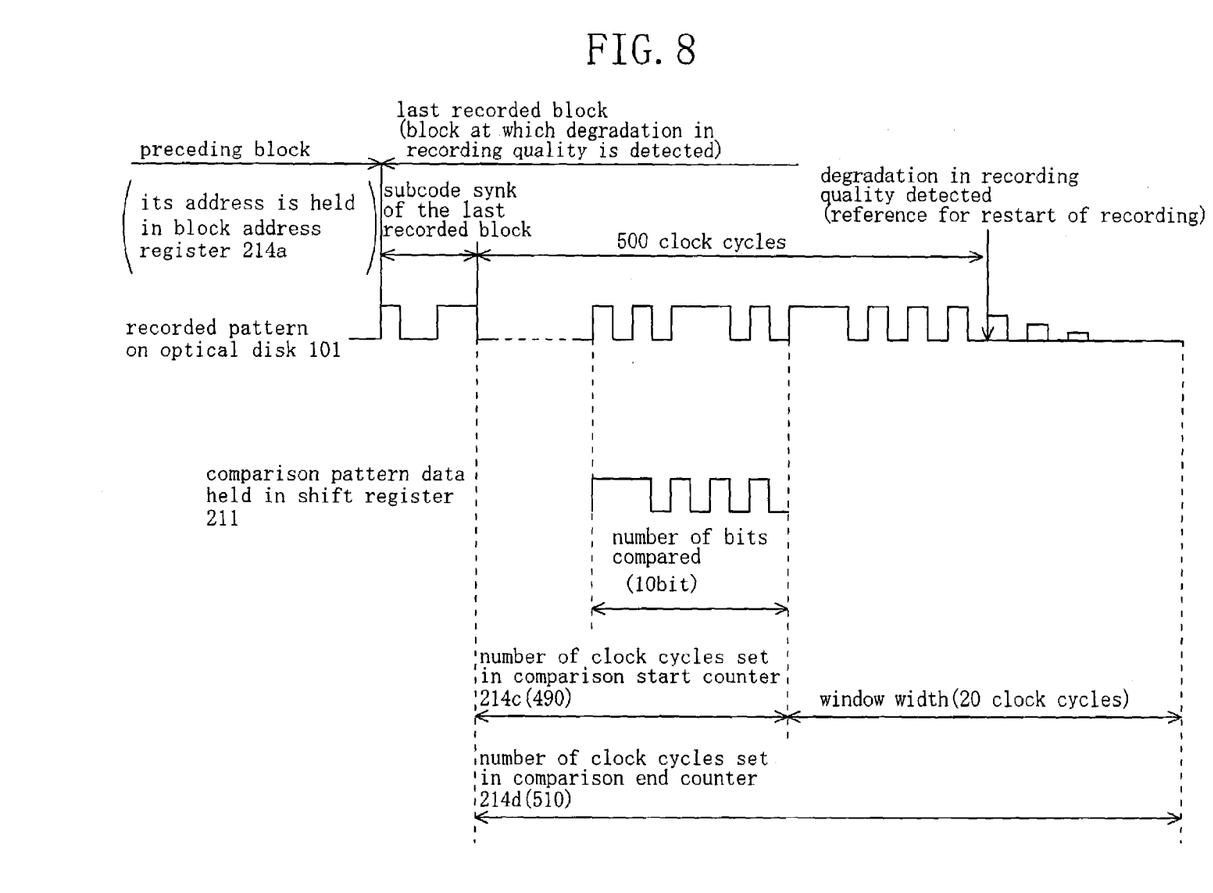
FIG. 8 illustrates an example of a recording pattern in an optical disk 101 and a comparison pattern data.

In the reproducing operation for confirming recording quality, when degradation in recording quality is detected by the recording quality-confirming section 209, an address that is one block before the last reproduced block is held in the block address register 214a of the match detection window-controlling section 214, and at the same time, the number of clock cycles (clock offset) from the location at which the subcode sync of the last reproduced block is detected to the location at which the match detection of pattern data is started or ended when later-described recording is restarted is set in the detection start counter 214c and the detection end counter 214d. More specifically, as shown in FIG. 8, in the case where the number of bits of the comparison pattern data is 10 bits, the comparison window width is 20 bits, and the number of PLL clock cycles from the subcode sync of the last recorded block until the detection of degradation in recording quality is 500 clock cycles, the detection start counter 214c is set at "490", and the detection end counter 214d is set at "510" (500±20/2). More precisely, in cases where the window overlaps across two blocks, the address of the block that is one more block before is held by the block address register 214a, and a number of clock cycles that is obtained with reference to the subcode sync of the next block (that is, the block that is one block before the last reproduced block) is set in the counters 214c and 214d.

In the re-encoding operation, in a similar manner to Embodiment 1, re-encoding is performed from the beginning of the block containing the data that is at least 108 EFM frame before the location at which degradation in recording quality is detected, but during this, the encoded pattern data output from the CD encoder 113 are input to the shift register 211 of the recording restart-controlling section 210, and are sequentially shifted in synchronous with write clocks to be held therein. Then, when re-encoding is stopped, the last 10 bits of the comparison pattern data are held in the shift register 211.

In the subsequent operation for detecting recording restart location, a normal reproducing operation is performed, and at the same time, reproduced pattern data that are reproduced corresponding to the recorded pit pattern are shifted bit by bit in synchronous with the PLL clock output from the CD decoder 107 and are held in the shift register 212 of the recording restart-controlling section 201.

The reproduced pattern data held in the shift register 212 is compared to the comparison pattern data held in the shift register 211 by the XOR circuit array 213a. Specifically, 10 bits of the reproduced pattern data that have been reproduced most recently are compared bit by bit to the last 10 bits of the comparison pattern data that ought to have been recorded in the optical disk 101 before the detection of degradation in recording quality, and if the number of matching bits are equal to or greater than a predetermined minimum matching bit number, the comparator 213c outputs a match decision signal which is at an H level. In other words, even if there are a few bit errors, writing is reliably restarted when there is a high possibility that a detected location is the location at which recording is to be restarted. (It should be noted that the bit errors themselves such as described above can be corrected by error correction with the CD-decoder 107 or the like, though it depends on the degree of errors.) When the degree of matching is low between the pattern data, it is possible that the location at which the recording is to be restarted cannot be found due to a large phase shift of the PLL clock, or that there is a serious physical damage at or near the location at which the recording was interrupted. If such is a case, it is highly probable that a proper data reproduction will not be performed, and therefore, restart of the writing is aborted.

Figure 9:
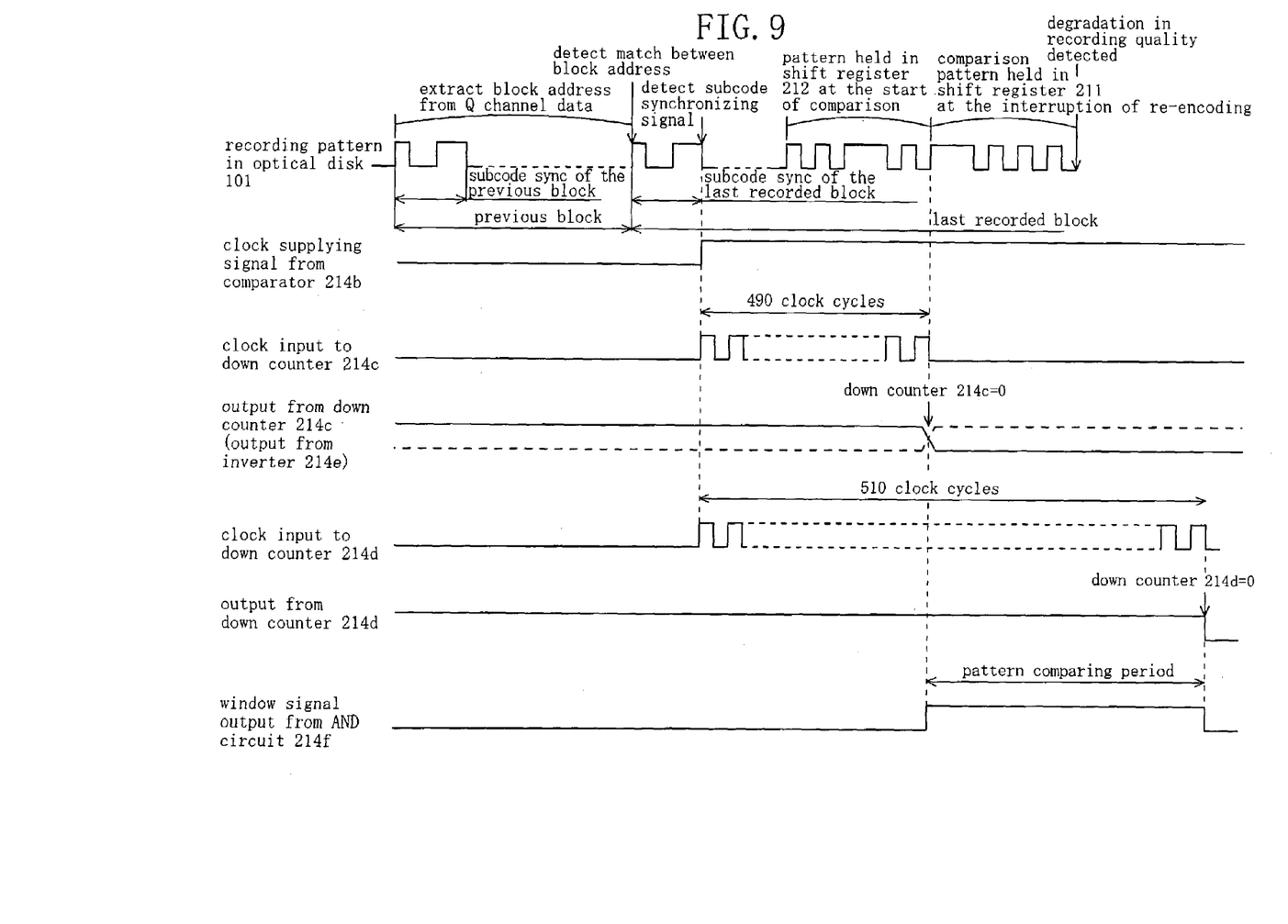
FIG. 9 is a timing chart showing operations or the like of various sections in the recording restart-controlling section 201.

Meanwhile, as shown in FIG. 9, the comparator 214b in the match detection window-controlling section 214 of the recording restart-controlling section 201 compares the block address output from the CD decoder 107 with the block address held in the block address register 214a based on the Q channel data of the subcode in the reproduced pattern data. Then, if, after the block addresses match, the CD decoder 107 outputs a signal indicating the detection of subcode sync, in other words, if the subcode sync of the last block that was reproduced before the degradation in recording quality is detected, the comparator 214b outputs a clock supply signal, which is at an H level, to input the PLL clock to the counters 214c and 214d. The counters 214c and 214d decrement the held values according to the PLL clock, and the AND circuit 213f outputs a window signal at an H level from the time when the value held in the detection start counter 214c becomes 0 until the value held in the detection end counter 214d becomes 0.

Then, when the match decision signal output from pattern match-detecting section 213 turns to an H level while the window signal output from the match detection window-controlling section 214 is at an H level, the recording restart signal that is output from the flip-flop 216 is held at an H level so that the recording is restarted to record a pit pattern that follows the pit pattern that has been recorded before the location at which degradation in recording quality is detected.

Figure 10:
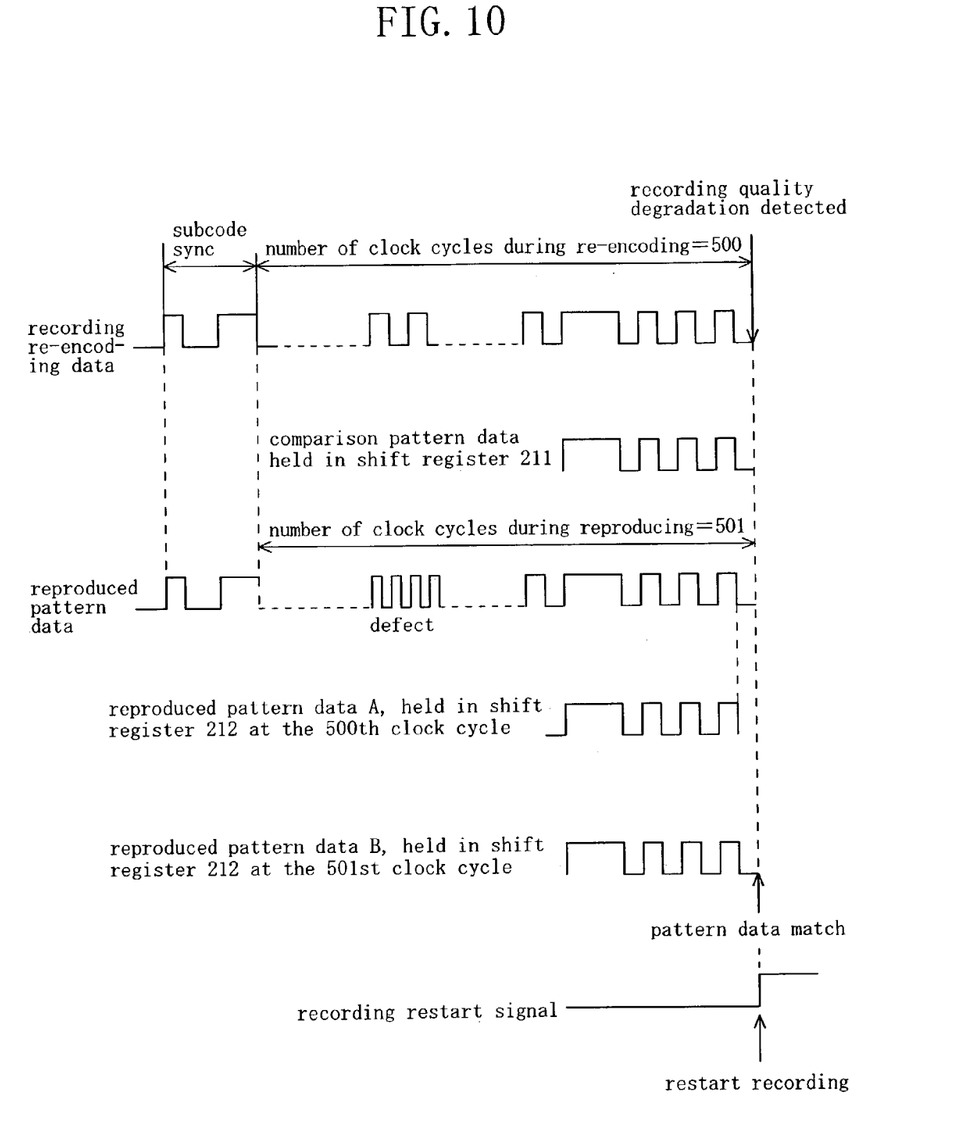
FIG. 10 is a timing chart showing the operations in cases where reproduced data have errors.

Here, for example as shown in FIG. 10, assume that when the recording is interrupted at the location of the 500th clock cycle from the subcode sync, the phase of PLL clock is shifted during the reproducing because of scratches or the like on the optical disk 101 and consequently the number of clock cycles from the subcode sync to the interrupted location thus becomes 501. In this case, at the time when the number of clock cycles from the subcode sync has reached 500, the reproduced pattern data A held in the shift register 212 does not match the comparison pattern data held in the shift register 211. As a consequence, the match decision signal that is output from the comparator 213c (accordingly the recording restart signal that is output from the flip-flop 216) does not turn to an H level, and the restart of the recording does not occur. However, pattern data B held in the shift register 212 at the next clock, the 501st clock, matches the comparison pattern data. Thus, the match decision signal and the recording restart signal become an H level, bringing the CD-ROM encoder 112, the CD encoder 113, the recording waveform-generating circuit 115, and so forth into an operating state, and the recording is restarted.

Nevertheless, even if the reproduced pattern data held in the shift register 212 matches the comparison pattern data held in the shift register 211, the recording is not restarted because the window signal that is output from the match detection window-controlling section 214 is at an L level when the number of clock cycles from the subcode sync is equal to or less than 489, or equal to or greater than 511, as shown in FIG. 9. In other words, it is conceivable that, even if a match is obtained between those pattern data, a large deviation of the number of clock cycles indicates that the pattern has matched with a pit pattern at a location completely different from the location at which recording has been interrupted merely by accident or that the phase shift of the PLL clock phase is large due to, for example, the damage to the already-recorded portion. If this is a case, it is highly probable that a proper data reproduction will not be performed. In view of this problem, the recording is restarted only when a match between the pattern data has been obtained within a predetermined window range, and thus, the restart of writing from an incorrect location or the like is prevented.

It should be noted that the minimum number of matching bits is not limited to a fixed number. For example, the following is possible; the minimum number of matching bits is set large at first (for example, the minimum number of matching bits is restricted to a complete match) to attempt restart of writing, and when restart of writing fails, the minimum number of matching bits is set smaller to further attempt restart of writing. In addition, it is possible to detect a portion at which a match is obtained between the pattern data, and then to restart recording from a portion at which the number of matching bits is large or a portion at which the deviation of number of clock cycles is small.

In addition, it is sufficient that the window width be appropriately set according to such factors as the recording characteristics of the device and the optical disk, the quality of the optical disk, the performance required for the device, and the like. For example, the window width may be 1 clock cycle so that the restart of writing is performed only when the pattern data match at the location with the same number of clock cycles as that when the recording was interrupted, that is, only when it is most probable that a proper data reproducing can be carried out. Alternatively, the window width may be set wide so that the restart of writing is performed when there is a possibility, if any, that the recorded data can be reproduced.

In addition, the following configurations are also possible. The device first attempts to restart writing with a narrow window width, but if the restart of writing is not possible, then the window width is set wider so that the restart of writing is again attempted. In another configuration, the device detects a location at which a match between the pattern data is obtained at least near the location of the interruption of the recording, and if the matching location is within a predetermined window width, the writing is restarted. In further another configuration, if more than one locations at which a match has been obtained are detected, the recording is restarted from the location at which the deviation of the number of clock cycles is the smallest.

In Embodiment 2 also, it is possible to confirm recording quality according to whether the subcode has been detected or not and to restart recording in the units of blocks.

As has been described thus far, according to the present invention, even when proper recording is difficult to continue because of external factors such as vibration, recording is restarted, after the interruption of the recording, retroactively from the portion where recording quality is degraded. Therefore, the recording can be properly comptleted.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A controller for a data recording device wherein, if recording to a recording medium is temporarily interrupted, then recording of unrecorded data is restarted so as to maintain continuity with recorded data that have been recorded before the interruption of the recording, comprising;
a detecting means for detecting a factor that degrades recording quality;
a recording interruption-controlling means for controlling the interruption of the recording according to the result of the detection performed by the detecting means; and
a recording restart-controlling means for restarting the recording operation from a location that is before the location at which the recording of the recorded data has been interrupted in the recording medium; and
a recording quality-detecting means for detecting recording quality by reproducing recorded content subsequent to the interruption of recording;
wherein the recording restart-controlling means is configured to decide the location at which the recording operation is restarted according to the recording quality.

2. The controller for a data recording device according to claim 1, wherein recording quality-detecting means is configured to detect the recording quality according to whether a synchronization pattern in a reproduced signal is detected or not.

3. The controller for a data recording device according to claim 1, wherein the recording quality-detecting means is configured to detect the recording quality according to a state of error occurrence in the reproduced signal.

4. The controller for a data recording device according to claim 3, wherein the state of error occurrence is at least one of the presence or absence of error, the degree of error, and the frequency of error occurrence.

5. The controller for a data recording device according to claim 1, wherein the recording quality-detecting means is configured to detect the recording quality according to an amplitude of the reproduced signal.

6. A controller for a data recording device wherein, if recording to a recording medium is temporarily interrupted, then recording of unrecorded data is restarted so as to maintain continuity with recorded data that have been recorded before the interruption of the recording, comprising:
a detecting means for detecting a factor that degrades recording Quality;
a recording interruption-controlling means for controlling the interruption of the recording according to the result of the detection performed by the detecting means; and
a recording restart-controlling means for restarting the recording operation from a location that is before the location at which the recording of the recorded data has been interrupted in the recording medium; and
a data buffer for holding recording data that have not yet been subject to interleaving;
wherein, prior to the restart of the recording operation, interleaving is performed again from the recording data that is at least an interleaving length backward from recording data corresponding to the location in the recording medium at which the recording operation is to be restarted.

7. A controller for a data recording device wherein, if recording to a recording medium is temporarily interrupted, then recording of unrecorded data is restarted so as to maintain continuity with recorded data that have been recorded before the interruption of the recording, comprising;
a detecting means for detecting a factor that degrades recording quality;
a recording interruption-controlling means for controlling the interruption of the recording according to the result of the detection performed by the detecting means; and
a recording restart-controlling means for restarting the recording operation from a location that is before the location at which the recording of the recorded data has been interrupted in the recording medium;
a data match-detecting means for detecting a match between at least part of prerecorded data that are used for the recording prior to the interruption of the recording and reproduced data that are reproduced subsequent to the interruption of the recording; and
a recording restart location-deciding means for deciding a location at which the recording is to be restarted according to the detection of the data match detected by the data match-detecting means.

8. A data recording device wherein, if recording to a recording medium is temporarily interrupted, then recording of unrecorded data is restarted so as to maintain continuity with recorded data that have been recorded before the interruption of the recording, comprising;
a recording data-generating means for generating recording data;
a recording means for recording the generated recording data;
a detecting means for detecting a factor that degrades recording quality;
a recording interruption-controlling means for controlling the interruption of the recording according to the result of the detection performed by the detecting means;
a recording restart-controlling means for restarting the recording operation from a location that is before the location at which the recording of the recorded data has been interrupted in the recording medium by operating the recording data-generating means and the recording means; and
a recording quality-detecting means for detecting recording quality by reproducing recorded content subsequent to the interruption of recording;
wherein the recording restart-controlling means is configured to decide the location at which the recording operation is restarted according to the recording quality.

9. A data recording device wherein, if recording to a recording medium is temporarily interrupted, then recording of unrecorded data is restarted so as to maintain continuity with recorded data that have been recorded before the interruption of the recording, comprising;
a recording data-generating means for generating recording data;
a recording means for recording the generated recording data;
a detecting means for detecting a factor that degrades recording quality;
a recording interruption-controlling means for controlling the interruption of the recording according to the result of the detection performed by the detecting means; and
a recording restart-controlling means for restarting the recording operation from a location that is before the location at which the recording of the recorded data has been interrupted in the recording medium by operating the recording data-generating means and the recording means; and a data buffer for holding recording data that have not yet been subject to interleaving;

wherein, prior to the restart of the recording operation, interleaving is performed again from the recording data that is at least an interleaving length backward from recording data corresponding to the location in the recording medium at which the recording operation is to be restarted.

10. A data recording device wherein, if recording to a recording medium is temporarily interrupted, then recording of unrecorded data is restarted so as to maintain continuity with recorded data that have been recorded before the interruption of the recording, comprising;

a recording data-generating means for generating recording data;

a recording means for recording the generated recording data;

a detecting means for detecting a factor that degrades recording quality;

a recording interruption-controlling means for controlling the interruption of the recording according to the result of the detection performed by the detecting means;

a recording restart-controlling means for restarting the recording operation from a location that is before the location at which the recording of the recorded data has been interrupted in the recording medium by operating the recording data-generating means and the recording means;

a data match-detecting means for detecting a match between at least part of prerecorded data that are used for the recording prior to the interruption of the recording and reproduced data that are reproduced subsequent to the interruption of the recording; and a recording restart location-deciding means for deciding a location at which the recording is to be restarted according to the detection of the data match detected by the data match-detecting means.

* * * * *